Figure 1:
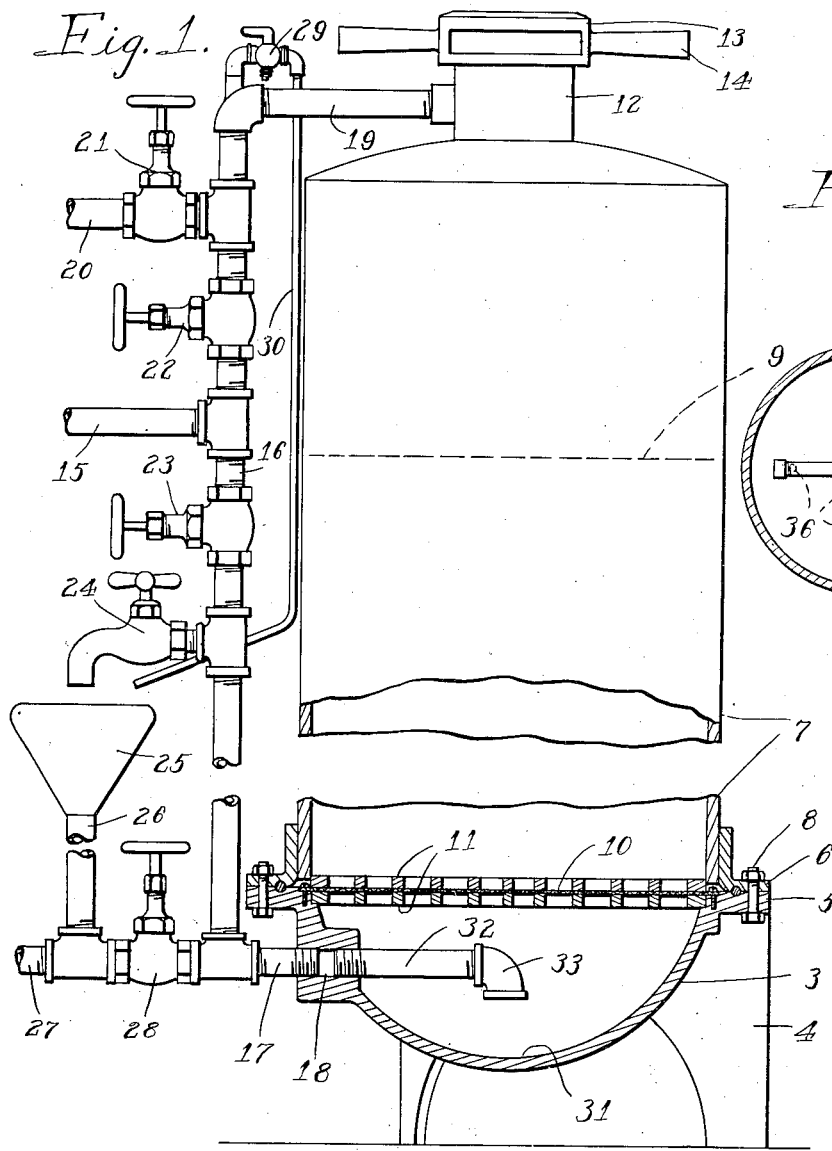

May 10, 1927.

O. W. JOHNSON

WATER SOFTENER

Filed Oct. 1, 1926

1,628,541

Inventor:
Oscar W. Johnson
By Wilson & McCanna
Attys

Patented May 10, 1927.

UNITED STATES PATENT OFFICE.

OSCAR W. JOHNSON, OF ROCKFORD, ILLINOIS, ASSIGNOR TO WARD-LOVE PUMP CORPORATION, OF ROCKFORD, ILLINOIS, A CORPORATION OF ILLINOIS.

WATER SOFTENER.

Application filed October 1, 1926. Serial No. 138,830.

This invention relates to water softeners operating on the base-exchange principle.

It is the main object of the present invention to provide a novel method of operating a water softener as well as a new construction of a water softener designed for such operation, whereby to enable securing water of zero hardness immediately after regeneration. In the past, this was not obtainable because of the lime-laden condition of a part of the mineral at the end of the bed of zeolite caused by the passing of hard water with the brine through the bed during regeneration. The layer of exhausted mineral, being disposed at the outlet end of the bed as respects the normal direction of flow for softening, transferred its hardness to the water after its passage through the bed for softening. Thus the water which would otherwise be supplied to the system as thoroughly softened water, were it not for its contact with the lime of the exhausted mineral just upon leaving the softener, was found by test to show appreciable hardness. In fact, water of zero hardness could not be obtained until practically all of the lime in the layer of exhausted mineral had been assimilated by the softened water in coursing through it on leaving the softener.

According to the present invention, which contemplates a softener operating with upward flow, I provide a water softener of such construction that, at the end of the regenerating operation, when the brine is drained from the softener tank, a certain amount of brine will be left in the bottom of the tank to be carried upwardly through the bed of zeolite with the water in the flushing operation, this brine being of a sufficient quantity to regenerate whatever amount of mineral in the bed was exhausted wholly or partially by the passage of the hard water with the brine therethrough during regeneration. Consequently, there is no lime left in the upper portion of the bed as was otherwise the case and the water, after passing through the bed for softening, will not be turned hard but will issue as water of zero hardness. The softener, immediately after regeneration, will, therefore, supply the desired soft water and there will not be a period where traces of hardness are evident. As will presently appear, the desired operation just described is secured simply by locating the lower pipe connection on the softener tank at a level sufficiently above the bottom of the tank so as to leave a predetermined amount of brine therein at the close of the regenerating operation. I also prefer to provide, along with this pipe connection, means for directing the incoming flushing water downwardly toward the bottom of the tank to insure picking up the brine for passage upwardly through the mineral bed.

The invention is illustrated in the accompanying drawing, wherein—

Figure 3:
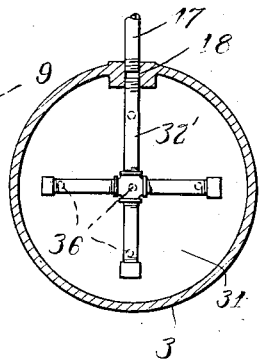
Figure 2:
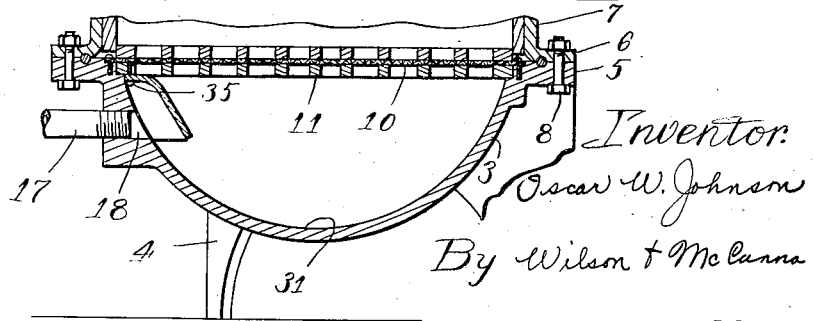

Figure 1 is a side view of a water softener installation showing the lower part of the softener tank in central vertical section to illustrate the novel features incorporated in accordance with my invention. An intermediate portion of the tank and pipe connections is broken away to enable showing the parts on a larger scale;

Fig. 2 is a view corresponding to the lower part of Fig. 1 illustrating a modified or alternative construction in the means employed for directing the incoming water downwardly toward the bottom of the tank; and Fig. 3 is a horizontal section on a considerably reduced scale of the bottom portion of the tank illustrating a still further modified or alternative form of means for the purpose last referred to, this particular construction being especially designed for use on larger units.

Similar reference numerals are applied to corresponding parts in the three views.

Referring for the present more particularly to Fig. 1, the softener illustrated is, for the most part, similar in construction to that disclosed in my copending application, Serial No. 46,198, filed July 27, 1925, and comprises a base 3 having supporting legs 4 and a bolting flange 5 to which the flange 6 of the tank 7 is secured by bolts 8. The tank contains the bed of zeolite or base-exchange water softening material. The material in the present case extends up to within a short distance of the top of the tank, as indicated by the dotted line at 9, and provision is made at the bottom for filtering and evenly distributing the water after entering the tank for passage upwardly through the material. A filter cloth 10 of very fine mesh is provided between reinforcing grids 11 to serve the purposes mentioned. The head space in the tank above the material allows the material to settle so as not to be carried off through the outlet and also furnishes a space for the reception of the regenerating or reconditioning material, such as common salt or salt brine, which may be poured or injected into the tank when the softener is to be regenerated. The neck portion 12 of the tank is fitted with a salt cap 13 which is applied and removed from the tank by the handles 14. Hard water is received through an inlet pipe 15 leading in from the city mains at the user's disposal. The pipe 15 is connected with a system of pipe fittings 16 extending vertically alongside the tank 7 and is arranged to communicate therethrough with the base 3 of the tank, as by means of a lower pipe connection 17. The latter is threadedly received in an opening 18 in the base 3 of the tank. The pipe 15 also communicates through the pipe fittings 16 with the top of the tank through an upper pipe connection 19 threading into the neck 12, as shown. The softened water leaves the tank through an outlet pipe 20 tapped into the pipe fittings 16 above the inlet pipe 15. A valve 21 is interposed in the outlet pipe and another valve 22 is interposed in the pipe fittings 16 between the inlet and outlet pipes 15 and 20 respectively. From the description thus far advanced, it will appear that water entering the inlet pipe 15 and flowing down through the pipe fittings 16, the valve 21 being assumed open, flows upwardly through the tank and is discharged through the outlet pipe 20. This corresponds to the normal flow through the softener in softening. The pipe 20 is, of course, assumed to be in communication with the usual service system to be supplied with soft water.

A valve 23 is provided below the inlet pipe 15 to shut off the normal flow through the softener and to enable reversing the direction of flow by opening the valve 22 during regeneration. Below the valve 23 a faucet or bib 24 is tapped into the pipe fittings 16 and discharges into an atmospheric timing funnel 25. The latter is carried by a standpipe 26 tapped into a waste pipe 27 on the discharge side of a valve 28 which controls the discharge of water from the tank through the waste pipe when draining the tank. It will now appear that the regenerating operation may be carried out as follows:—all of the valves, namely 21, 22, 23, 24, and 28 will be closed. The bib 24 will then be opened which starts a flow of water into the funnel 25 which stops as soon as the pressure of the line communicating with the inlet pipe 15 is released from the tank. The salt cap 13 is then removed and the proper amount of salt or brine is introduced into the tank. Upon the removal of the salt cap, there is obviously a flow from the bib 24 and sufficient water is drained from the tank to permit the introduction of salt or brine, as the case may be. The salt cap, after the introduction of the salt or brine, is replaced and the bib 24 is closed to prevent further drainage. Thereupon an air valve 29, communicating with the system of pipe fittings 16, adjacent the upper pipe connection 19, is opened and the same is true of the valve 23. This allows the tank to refill so that there is water present sufficient to assimilate the salt. As soon as water flows from an overflow pipe 30, which communicates with the air valve 29, and discharges into the funnel 25, the air valve is closed and thereupon the valve 23 is closed. This is to avoid the wasting of any brine. The valve 22 is then opened so as to allow hard water to enter the top of the softener tank to wash the salt down through the mineral bed. The bib 24 is opened and adjusted to maintain a certain predetermined level in the funnel 25 thereby avoiding the likelihood of the brine being passed through the mineral bed at anything beyond a certain rate. It is understood that a certain time element is involved and it is wasteful, therefore, to pass regenerating fluid through the mineral any faster than an exchange can properly occur between it and the softening material. After the salt has been washed down through the mineral bed for a certain specified length of time, usually about thirty minutes in the case of the average sized household unit, the valve 22 is closed as it is assumed that sufficient brine has then been passed through the mineral bed to completely restore it to its full softening capacity. It is, however, important to note at this point that, as a result of the passing of the hard water down through the mineral bed in order to carry the salt or brine downwardly therethrough, the head space in the tank at the close of the regenerating operation and prior to the flushing operation, to be next referred to, is filled with hard water. The mineral bed has, as a result of the passage of the hard water, suffered a certain amount of exhaustion at the top thereof and the mineral at this point is consequently lime-laden. In accordance with the usual practice, the hard water in the head space above the mineral was flushed out after the regenerating operation in what was termed the backwash, flushing or washing operation. That is, hard water was caused to flow upwardly through the mineral so as to be softened and then displace the hard water from the head space out through a waste outlet. In other words, the object was to eliminate any hard water from the softener so that when the softener was again connected with the service system there would be no hard water injected into the system.

It was found, however, that the lime-laden condition of the mineral at the top of the bed turned the softened water into hard water and it was impossible, therefore, to secure water of zero hardness immediately after regeneration. The water on actual test after regeneration would show appreciable hardness. In fact, it would take some time before water of zero hardness could be obtained as practically all of the lime in the layer of exhausted mineral had to be assimilated by the softened water before truly soft water could be secured. This is readily understood when it is considered that the hard water, in passing through the mineral from the bottom upwardly, is converted into water of zero hardness and as a result will then have considerably affinity for lime. In fact, it may be stated that such water is in a nascent condition and will readily assimilate the lime upon coming in contact with it at the outlet end of the bed. According to the present invention, as will now be described, I make a provision whereby a certain amount of brine is reserved at the end of the regenerating operation for passage back through the mineral bed with the flushing water, the brine being in a sufficient quantity to regenerate whatever amount of mineral in the bed was exhausted wholly or partially by the passage of the hard water with the brine through the same in the regenerating operation.

According to my invention, the pipe connection 17 is disposed an appreciable distance above the actual bottom of the tank so as to leave a predetermined amount of brine therein when the tank is drained at the close of the regenerating operation and prior to the flushing operation. It will be noted that the base 3 is dished or basin-shaped to provide a rounded basin bottom or hollow 31. The opening 18 for the pipe connection 17 is at an appreciable elevation with respect to the basin 31 and near the rim portion thereof, as shown. At the close of the regenerating operation, the valve 28 is opened to establish communication between the bottom of the tank and the waste pipe 27. The air valve 29 is then opened whereupon the tank will drain in an obvious manner. The hard water in the head space, for the most part, is softened by being lowered into the mineral bed as the level is permitted to drop usually to about the level of the bib 24. Actual tests may be made to insure the lowering of the level in the tank to this point as the valve 28 may be closed and the bib 24 opened. Then, if there is still a flow from the bib 24, it is evident that the level has not been dropped sufficiently. When the draining is completed, the valve 28, as well as the bib 24, is closed. It is obvious that the location of the lower pipe connection 17 at such an elevation above the bottom of the tank insures the presence of a certain amount of brine in the bottom of the tank in the basin 31 as there is no way for this brine to be drained out through the waste pipe 27. This is picked up by the flushing water in the backwash or flushing operation and carried upwardly through the mineral bed and serves to regenerate the layer or strata of exhausted mineral at the top of the bed. In the flushing operation, the air valve 29 is left open and the valve 23 is then opened so that the brine in the bottom of the tank will be picked up by the flushing water and carried upwardly through the mineral bed. The brine thus encounters the exhausted mineral at the top of the bed and revives the same. The flushing water with the brine then escapes through the upper pipe connection 19 through valve 29 and overflow pipe 30 into the funnel 25 and thence to the waste pipe 27. The flow is continued until the water tests soft whereupon the air valve 29 is closed and the valve 21 opened to restore connection with the service system.

I prefer to provide means along with the lower pipe connection 17 to direct the incoming water downwardly so as to make certain that the brine in the bottom of the tank will be picked up. Obviously, a variety of means may be employed for this purpose. In Fig. 1 a lead-in pipe 32 is illustrated threading in the opening 18 and having an elbow 33 at the inner end thereof directed downwardly toward the center of the basin bottom 31. This will insure the picking up of the brine so that it will be entrained with the flushing water as it passes upwardly through the mineral bed. I prefer, however, to provide a baffle plate 34, as shown in Fig. 2, generally trough-shaped and supported adjacent the opening 18 so as to direct the incoming water approximately on a tangent along the side wall of the basin 31 downwardly toward the center of the basin so as to pick up the brine and carry it along in the passage of the water upwardly through the mineral bed. The baffle 34 is shown secured by screws 35 to the lower grid 11. In Fig. 3 a pipe fitting 32' of cross form is shown communicating with the pipe connection 17 and having openings 36 at the center of the base 3 and at points on a common radius with respect to the same for directing the incoming water at a plurality of points downwardly toward the basin bottom 31. This arrangement is particularly suited for larger sized installations while that shown in Fig. 2 is designed for smaller units such as are commonly installed for household purposes.

As a result of the absence of any lime-laden mineral at the outlet end of the bed, that is, at the top thereof in the case of an upflow softener, the water issuing from the softener immediately after regeneration will be found on test to be of zero hardness. It is not necessary to run the softener for a considerable period before water of such softness may be drawn, as was otherwise the case. Obviously, the present method of operation does not require the use of any more salt or brine than is otherwise used and still the operation of the softener is improved to a considerable extent, as pointed out above.

I claim:

1. The method of operating a base-exchange water softener which consists, first, in passing hard water through a zeolite material bed for softening, second, passing brine or other reagent with hard water through the bed of material in one direction for regenerating the same, and third, passing hard water in the opposite direction through the bed to wash the same, the hard water being accompanied with a certain amount of brine or reagent sufficient to regenerate whatever amount of material in the bed was exhausted in whole or part by the passage of the hard water with the brine through the material during regeneration.

2. The method of operating a base-exchange water softener which consists, first, in passing hard water in one direction through a zeolite material bed for softening, second, passing brine or other reagent with hard water in the opposite direction through the bed of material for regenerating the same, and third passing hard water through the bed in the reverse direction from the regeneration flow, that is, in the same direction as the softening flow, to wash the same, the hard water being accompanied with a certain amount of brine or reagent sufficient to regenerate whatever amount of material in the bed was exhausted in whole or part due to the passage therethrough of the hard water with the brine during regeneration.

3. The method of operating a base-exchange water softener which consists, first, in passing hard water upwardly through a bed of zeolite material for softening, second, passing brine or other reagent with hard water downwardly through the bed of material for regenerating the same, and third, passing hard water upwardly through the bed to wash the same, the hard water being accompanied with some brine sufficient to regenerate whatever material at the top of the bed was exhausted wholly or partially by the downflow of hard water during regeneration, the operations above described being thereafter repeated in the order given.

4. In a water softener, a tank for softening material having pipe connections for the upper and lower ends thereof whereby to pass hard water upwardly through the material in the tank for softening, to pass brine downwardly through the material for regenerating, and to pass hard water up through the material for flushing, the connection at the lower end of said tank being sufficiently above the level of the bottom thereof to leave an appreciable volume of brine in the bottom of said tank at the close of the regenerating operation and previous to the flushing operation, and means in conjunction with the lower pipe connection for directing the incoming water downwardly before it passes upwardly through the tank whereby in the flushing operation to pick up the brine left in the bottom of the tank.

5. In a water softener as set forth in claim 4, wherein the bottom for said tank is basin-shaped and has the lower pipe connection near the rim of such basin, the provision of the last mentioned means in conjunction with the lower pipe connection arranged to direct the incoming water downwardly to the bottom of said basin before it passes upwardly through the tank whereby in the flushing operation to pick up the brine left in the bottom of the tank in said basin.

6. In a water softener as set forth in claim 4, wherein the bottom for said tank is basin-shaped and has the lower pipe connection near the rim of such basin, the provision of the last mentioned means adjacent said pipe connection for deflecting the incoming water downwardly and inwardly toward the center of the basin so as to pick up the brine left in the bottom of the tank to be entrained with the water as it passes upwardly through the material.

In witness of the foregoing I affix my signature.

OSCAR W. JOHNSON.